US009158551B2

(12) United States Patent
Im et al.

(10) Patent No.: US 9,158,551 B2
(45) Date of Patent: Oct. 13, 2015

(54) ACTIVATING AND DEACTIVATING OPERATING SYSTEM (OS) FUNCTION BASED ON APPLICATION TYPE IN MANYCORE SYSTEM

(71) Applicant: SAMSUNG ELECTRONICS CO., LTD., Suwon-si, Gyeonggi-do (KR)

(72) Inventors: Chae Seok Im, Suwon-si (KR); Seung Won Lee, Hwaseong-si (KR); Shi Hwa Lee, Seoul (KR); Jae Don Lee, Paju-si (KR); Min Kyu Jeong, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 246 days.

(21) Appl. No.: 13/734,045

(22) Filed: Jan. 4, 2013

(65) Prior Publication Data

US 2013/0179674 A1 Jul. 11, 2013

(30) Foreign Application Priority Data

Jan. 5, 2012 (KR) ........................ 10-2012-0001461

(51) Int. Cl.
*G06F 9/44* (2006.01)
*G06F 9/445* (2006.01)
*G06F 9/50* (2006.01)

(52) U.S. Cl.
CPC .......... *G06F 9/4411* (2013.01); *G06F 9/44505* (2013.01); *G06F 9/50* (2013.01)

(58) Field of Classification Search
CPC ....... G06F 9/50; G06F 9/5061; G06F 9/5016; G06F 9/505; G06F 9/5027; G06F 9/5077; G06F 9/52; G06F 1/00; G06F 9/44; G06F 9/4411
USPC .......................................................... 713/100
See application file for complete search history.

(56) References Cited

U.S. PATENT DOCUMENTS 5,303,369 A * 4/1994 Borcherding et al. ........ 718/104
6,195,676 B1 * 2/2001 Spix et al. ..................... 718/107
6,438,698 B1 * 8/2002 Hellum ......................... 713/322
6,742,100 B1 * 5/2004 Schnee et al. ................. 711/173
6,839,787 B2 * 1/2005 Lehwalder et al. ........... 710/301
6,910,213 B1 * 6/2005 Hirono et al. ................. 718/108
7,139,855 B2 * 11/2006 Armstrong et al. ........... 710/200
7,398,380 B1 * 7/2008 Lovett et al. ...................... 713/1
7,627,770 B2 * 12/2009 Jones ........................... 713/300
7,856,562 B2 * 12/2010 Branover et al. ............. 713/300
7,996,847 B2 * 8/2011 Wong et al. ................... 718/104
8,074,026 B2 * 12/2011 Kim et al. ..................... 711/118
8,250,513 B1 * 8/2012 Verma et al. .................. 716/126
8,381,223 B2 * 2/2013 Van Dyke et al. ............ 718/104

(Continued)

FOREIGN PATENT DOCUMENTS

JP 2008-33877 2/2008
KR 10-2009-0055459 6/2009

(Continued)

*Primary Examiner* — Thomas Lee
*Assistant Examiner* — Santosh R Poudel
(74) *Attorney, Agent, or Firm* — Staas & Halsey LLP

(57) ABSTRACT

An apparatus and method for dynamically reconfiguring an Operating System (OS) for a manycore system are provided. The apparatus may include an application type determining unit to determine a type of an executed application, and an OS reconfiguring unit to activate only at least one function in an OS, based on the determined type of the application, and to reconfigure the OS.

13 Claims, 10 Drawing Sheets

| | | | | |
|---|---|---|---|---|
| 410 | Application type | Stream processing | Data-parallel processing | Multithreading |
| 420 | OS configuration | Pipelining | Scatter-gather | SMP |
| | Features | | | |
| 430 | Tick handling | X | X | O |
| 430 | Multitasking | X | X | O |
| 430 | Load balancing | X | O | O |
| 430 | Define & synch. | O | O | O |
| | | 440 | 450 | 460 |

(56) References Cited

U.S. PATENT DOCUMENTS

| | | | | |
|---|---|---|---|---|
| 8,386,672 | B2 * | 2/2013 | Tsuei et al. | 710/62 |
| 8,443,178 | B2 * | 5/2013 | Kohiga | 713/1 |
| 8,458,402 | B1 * | 6/2013 | Karnik | 711/122 |
| 8,656,408 | B2 * | 2/2014 | Elshishiny et al. | 718/108 |
| 8,732,439 | B2 * | 5/2014 | Lippett | 712/214 |
| 2002/0046332 | A1 * | 4/2002 | Ueno | 711/168 |
| 2002/0103847 | A1 * | 8/2002 | Potash | 709/107 |
| 2002/0112102 | A1 * | 8/2002 | Tarui et al. | 710/60 |
| 2003/0236814 | A1 * | 12/2003 | Miyasaka et al. | 709/102 |
| 2004/0153733 | A1 * | 8/2004 | Lin | 714/6 |
| 2004/0177243 | A1 * | 9/2004 | Worley, Jr. | 713/2 |
| 2004/0215939 | A1 * | 10/2004 | Armstrong et al. | 712/220 |
| 2005/0044228 | A1 * | 2/2005 | Birkestrand et al. | 709/226 |
| 2005/0125702 | A1 * | 6/2005 | Huang et al. | 713/320 |
| 2005/0132121 | A1 * | 6/2005 | Robinson | 711/100 |
| 2005/0141554 | A1 * | 6/2005 | Hammarlund et al. | 370/468 |
| 2005/0289213 | A1 * | 12/2005 | Newport et al. | 709/200 |
| 2006/0136605 | A1 * | 6/2006 | Olukotun | 710/1 |
| 2006/0174246 | A1 * | 8/2006 | Tamura et al. | 718/100 |
| 2006/0206891 | A1 * | 9/2006 | Armstrong et al. | 718/1 |
| 2006/0221961 | A1 * | 10/2006 | Basso et al. | 370/390 |
| 2006/0277551 | A1 * | 12/2006 | Accapadi et al. | 718/107 |
| 2007/0005757 | A1 * | 1/2007 | Finger et al. | 709/224 |
| 2007/0113231 | A1 * | 5/2007 | Honmura | 718/100 |
| 2007/0156940 | A1 * | 7/2007 | Zmudzinski et al. | 710/240 |
| 2007/0157211 | A1 * | 7/2007 | Wang et al. | 719/313 |
| 2007/0204268 | A1 * | 8/2007 | Drepper | 718/102 |
| 2007/0266391 | A1 * | 11/2007 | Hoffman et al. | 718/106 |
| 2007/0294689 | A1 * | 12/2007 | Garney | 718/1 |
| 2008/0086617 | A1 * | 4/2008 | Kasahara et al. | 711/167 |
| 2008/0115150 | A1 * | 5/2008 | Jagana et al. | 719/319 |
| 2008/0155553 | A1 * | 6/2008 | Astigarraga et al. | 718/108 |
| 2008/0163210 | A1 | 7/2008 | Bowman et al. | |
| 2008/0163239 | A1 * | 7/2008 | Sugumar et al. | 718/105 |
| 2008/0184247 | A1 * | 7/2008 | Hughes et al. | 718/104 |
| 2008/0201393 | A1 * | 8/2008 | Krauss | 707/206 |
| 2008/0235700 | A1 * | 9/2008 | Iguchi | 718/104 |
| 2008/0294866 | A1 * | 11/2008 | Kurichiyath et al. | 711/201 |
| 2009/0049451 | A1 * | 2/2009 | Bates | 718/108 |
| 2009/0198883 | A1 * | 8/2009 | Fortin et al. | 711/112 |
| 2009/0222835 | A1 * | 9/2009 | Effing et al. | 718/104 |
| 2010/0058351 | A1 * | 3/2010 | Yahagi | 718/104 |
| 2010/0169673 | A1 * | 7/2010 | Saripalli | 713/300 |
| 2010/0281285 | A1 * | 11/2010 | Blanding | 713/324 |
| 2011/0035612 | A1 * | 2/2011 | Chall et al. | 713/323 |
| 2011/0113406 | A1 | 5/2011 | Flemming et al. | |
| 2011/0161592 | A1 * | 6/2011 | Nachimuthu et al. | 711/125 |
| 2011/0284625 | A1 * | 11/2011 | Smith et al. | 235/375 |
| 2011/0296420 | A1 * | 12/2011 | Pegushin et al. | 718/102 |
| 2012/0324464 | A1 * | 12/2012 | Slater et al. | 718/104 |

FOREIGN PATENT DOCUMENTS

| | | |
|---|---|---|
| KR | 10-2009-0115115 | 11/2009 |
| KR | 10-2010-0039674 | 4/2010 |
| KR | 10-2010-0069572 | 6/2010 |
| KR | 10-0962531 | 6/2010 |

* cited by examiner

FIG. 4

| Application type (410) | Stream processing | Data-parallel processing | Multithreading |
|---|---|---|---|
| OS configuration (420) | Pipelining | Scatter-gather | SMP |
| Features | | | |
| Tick handling | X | X | O |
| Multitasking | X | X | O |
| Load balancing | X | O | O |
| Define & synch. | O | O | O |
| 430 | 440 | 450 | 460 |

ACTIVATING AND DEACTIVATING OPERATING SYSTEM (OS) FUNCTION BASED ON APPLICATION TYPE IN MANYCORE SYSTEM

CROSS-REFERENCE TO RELATED APPLICATIONS

This application claims the priority benefit of Korean Patent Application No. 10-2012-0001461, filed on Jan. 5, 2012, in the Korean Intellectual Property Office, the disclosure of which is incorporated herein by reference.

BACKGROUND

1. Field

One or more example embodiments of the following description relate to an apparatus and method for dynamically reconfiguring an Operating System (OS) for a manycore system that may provide a scheme of dynamically and efficiently managing reconfigurable resources.

2. Description of the Related Art

Due to an increase in demand for low power and high performance of applications, a manycore system employing a plurality of processing cores is on the rise. To efficiently manage resources of a manycore system, a method of partitioning the manycore system into relatively smaller partitions and assigning the partitions to an individual application is frequently used.

FIGS. 1A and 1B illustrate diagrams of a conventional hypervisor-based manycore OS, and a conventional microkernel-based manycore OS, respectively.

Referring to FIG. 1A, resources may be partitioned using a hypervisor 110, and an OS 120 and an application 130 may be executed for each of the partitioned resources. However, there is a disadvantage in that the partitioned resources remain unchanged during initialization of a system and the OS 120.

Referring to FIG. 1B, only a minimum function of an OS 150, for example a resource management or a communication between cores, may be provided, and the other functions may be provided as services in a separate partition. Additionally, partitions may be dynamically assigned based on demands of an application.

However, since a partition for an OS needs to be fixed and assigned, usability of the cores may be reduced. In other words, conventional designs may have a problem of a low usability of cores due to a fixed function of a part of or all of cores. Additionally, there is a disadvantage in that a response time of an OS system call is extended by adding a layer, for example a microkernel, a hypervisor, and the like.

SUMMARY

The foregoing and/or other aspects are achieved by providing an apparatus for dynamically reconfiguring an Operating System (OS) for a manycore system, the apparatus including an application type determining unit to determine a type of an executed application, and an OS reconfiguring unit to deactivate at least one function in an OS, based on the determined type of the application, and to reconfigure the OS.

The foregoing and/or other aspects are achieved by providing a method of dynamically reconfiguring an OS for a manycore system, the method including determining a type of an executed application, and deactivating at least one function in an OS, based on the determined type of the application, and reconfiguring the OS.

The foregoing and/or other aspects are achieved by providing a method of dynamically reconfiguring an OS for a manycore system. The method includes determining a type of application to be executed in the manycore system, determining whether a function associated with the type of application to be executed is necessary or unnecessary, and deactivating the function associated with the type of application determined to be executed when the function is determined to be unnecessary.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 4 illustrates a diagram of an example of setting an OS partition based on a type of an application using an apparatus for dynamically reconfiguring an OS for a manycore system according to example embodiments;

DETAILED DESCRIPTION

Figure 1A:
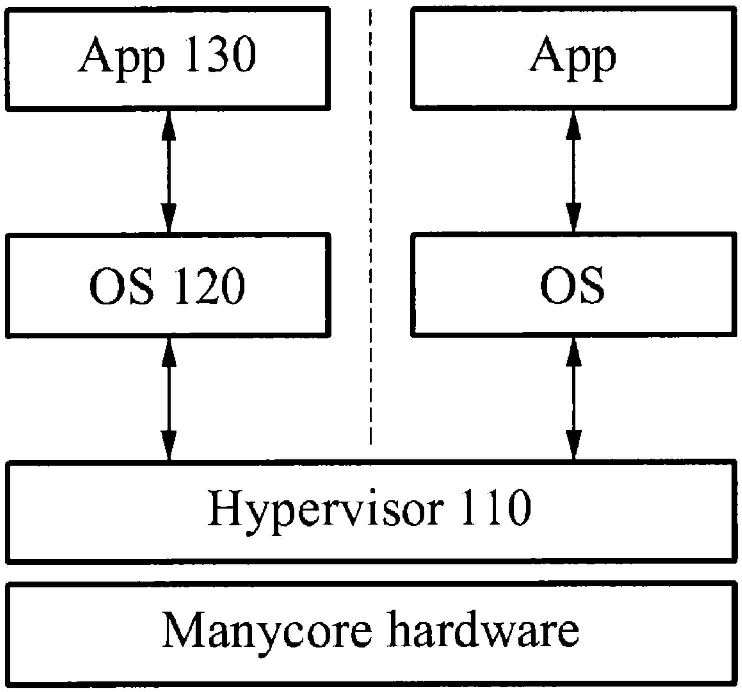
FIGS. 1A and 1B illustrate diagrams of a conventional hypervisor-based manycore Operating System (OS), and a conventional microkernel-based manycore OS, respectively.
Figure 1B:
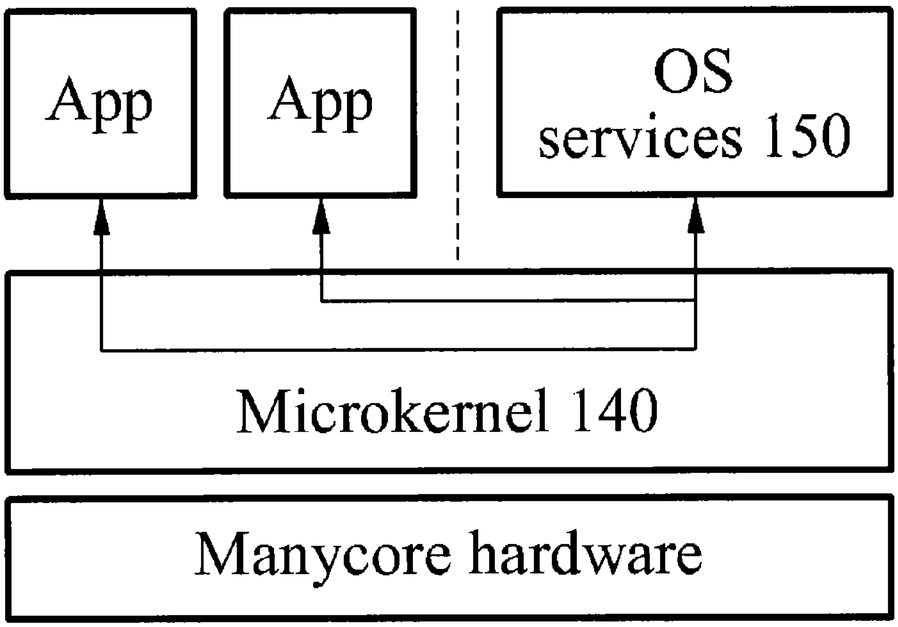

Reference will now be made in detail to example embodiments, examples of which are illustrated in the accompanying drawings, wherein like reference numerals refer to the like elements throughout. Example embodiments are described below to explain the present disclosure by referring to the figures.

An apparatus for dynamically reconfiguring an Operating System (OS) for a manycore system according to example embodiments may include an application type determining unit to determine a type of an executed application, and an OS reconfiguring unit to activate only at least one function in an OS, based on the determined type of the application, and to reconfigure the OS. Hereinafter, the apparatus for dynamically reconfiguring an OS for a manycore system may be referred to as an "OS reconfiguration apparatus."

The OS reconfiguration apparatus may deactivate a function of an OS that is not used in applications, and may remove system overhead, based on types of applications to improve overall system performance.

Hereinafter, an apparatus and method for dynamically reconfiguring an OS for a manycore system according to example embodiments will be further described.

Figure 2:
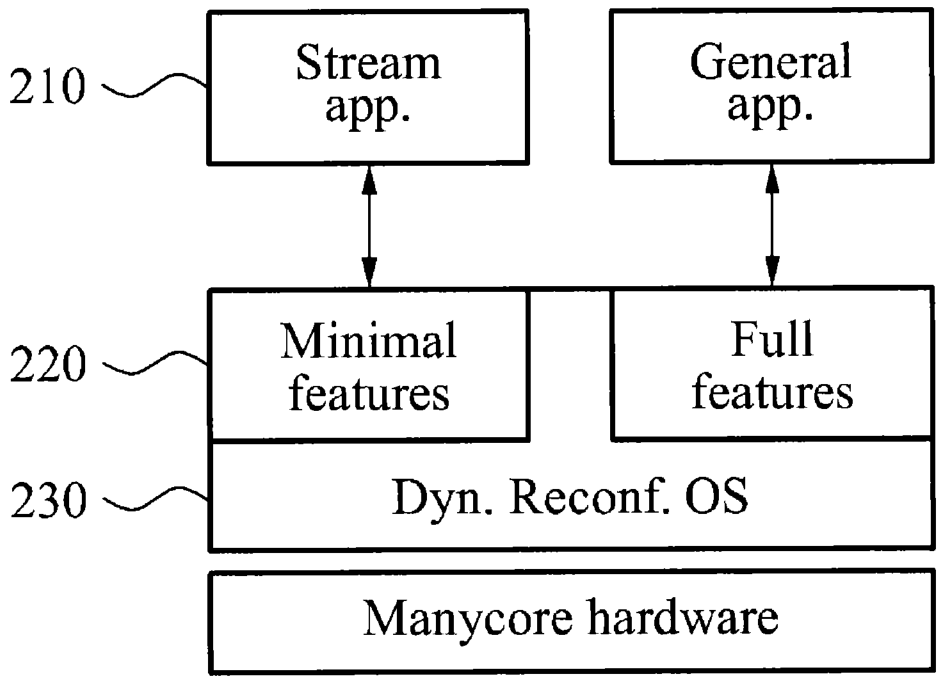
FIG. 2 illustrates a diagram of an apparatus for dynamically reconfiguring an OS for a manycore system according to example embodiments.

FIG. 2 illustrates a diagram to explain an effect obtained by using an OS reconfiguration apparatus according to example embodiments.

When the OS reconfiguration apparatus is used, all cores may be assigned to execute an application, and accordingly the cores may have high usability. Additionally, since the OS reconfiguration apparatus does not require a separate layer, a long response time to an OS system call may not be required.

Furthermore, when the OS reconfiguration apparatus is used, a function of an OS 230 may be dynamically reset for each partition, based on features of an application to be executed.

For example, referring to FIG. 2, in a partition used to execute a stream application 210, only a single task 220 may be assigned per core, and an OS execution overhead may be reduced by excluding a multitasking function, and the like.

Figure 3:
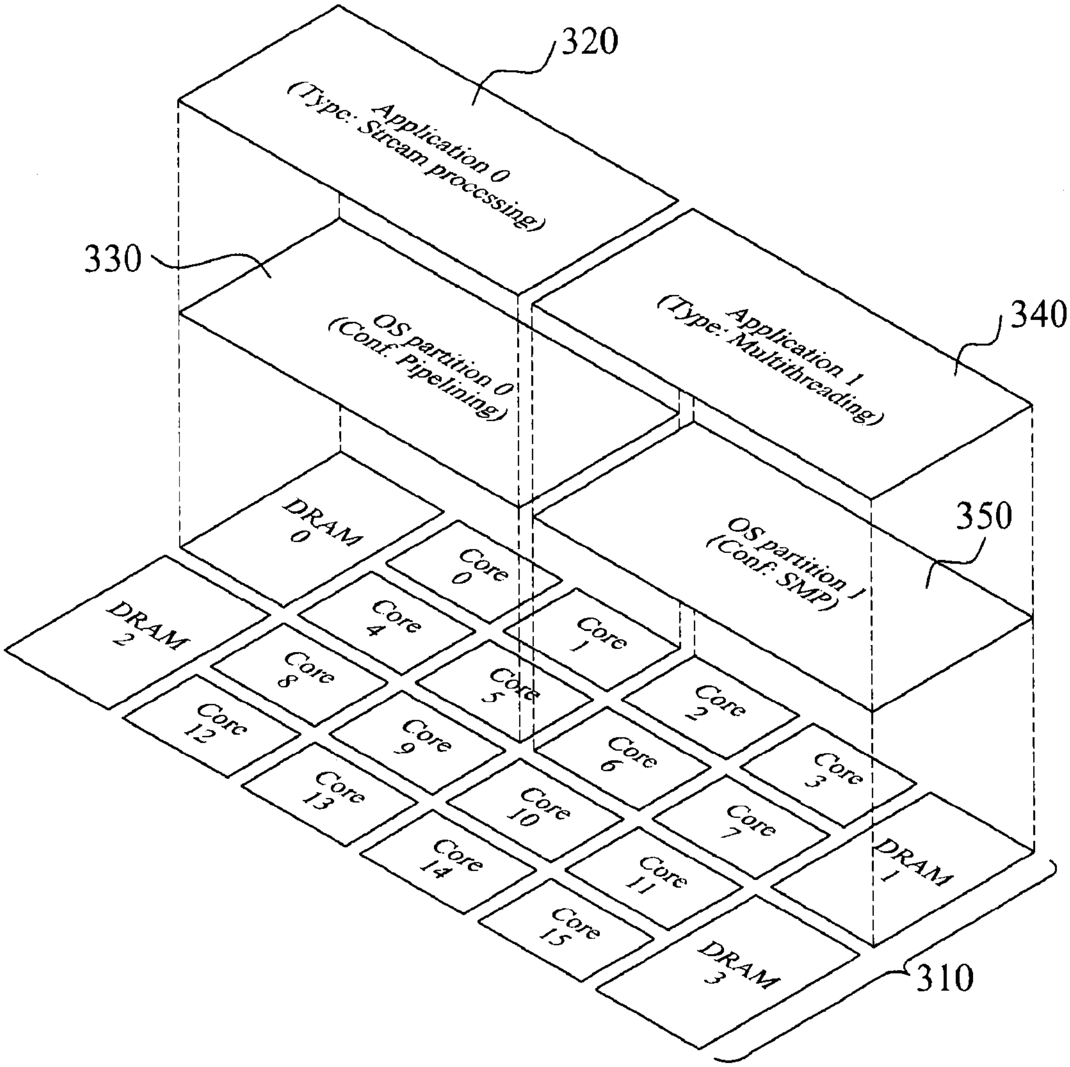
FIG. 3 illustrates a diagram of a 16-core system applied to an apparatus for dynamically reconfiguring an OS for a manycore system according to example embodiments.

FIG. 3 illustrates a diagram of a 16-core system applied to an OS reconfiguration apparatus according to example embodiments.

Although system 310 of FIG. 3 is assumed to include 16 cores and four Dynamic Random Access Memories (DRAMs), the example embodiments should not be limited to a particular quantity of resources.

The 16-core system of FIG. 3 may be operated based on the scenario described below.

A user may start application 0 320. A type of the application 0 320 may be determined by an application type determining unit included in the OS reconfiguration apparatus. The application 0 320, as an example, may be determined as a stream processing type.

For example, the application type determining unit may verify an executed application, and may determine a type of the verified application to be at least one of a stream processing type, a data-parallel processing type, and a multithreading type.

An OS reconfiguring unit included in the OS reconfiguration apparatus may assign an OS partition assignable in a system based on the determined type of the application, and may reconfigure the assigned OS partition.

For example, the OS reconfiguring unit may assign a resource partition to the application 0 320. An amount of resources to be demanded, for example a number of cores, a memory size, and the like, may be determined and requested by a user or a loader, and the OS reconfiguring unit may analyze available resources of a system, and may appropriately allocate the available resources. In this example, four cores, namely core 0, core 1, core 4, and core 5, and DRAM 0 neighboring the four cores may be allocated. The four cores and the DRAM 0 may be used as resources of OS partition 0 330.

The OS reconfiguring unit may set a corresponding OS partition to be used for pipelining, based on a type of an application, for example a stream processing type. In the same manner, when a user starts application 1 340 with a multithreading type, resources, for example, core 2, core 3, core 6, core 7, and DRAM 1, may be allocated, and OS partition 1 350 corresponding to the application 1 340 may be set to be used for Symmetric Multi-Processing (SMP).

For example, the OS reconfiguring unit may set the assigned OS partition to be used for at least one of pipelining, scatter-gather, and SMP, and may reconfigure the OS.

FIG. 4 illustrates a diagram of an example of setting an OS partition based on a type of an application using an OS reconfiguration apparatus according to example embodiments.

Figure 5:
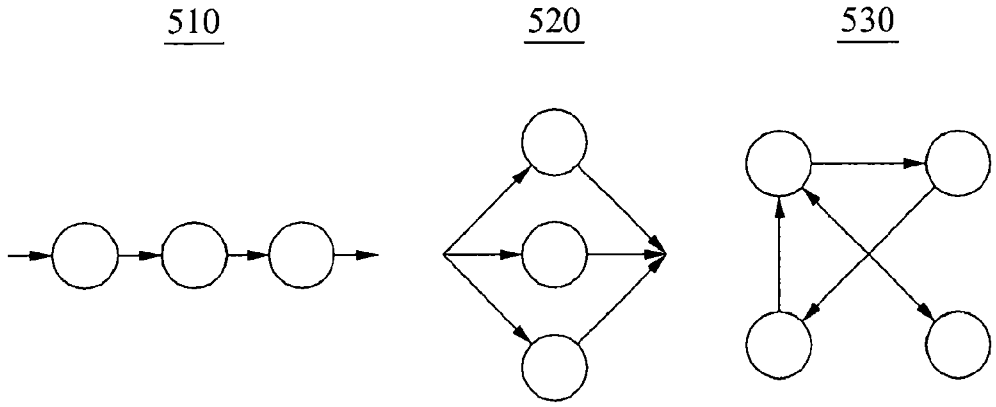
FIG. 5 illustrates a diagram of a type of an application using an apparatus for dynamically reconfiguring an OS for a manycore system according to example embodiments.

Additionally, FIG. 5 illustrates a diagram to explain a type of an application using an OS reconfiguration apparatus according to example embodiments.

An application type determining unit included in the OS reconfiguration apparatus may verify an executed application, and may determine a type of the verified application to be at least one of a stream processing type, a data-parallel processing type, and a multithreading type, as described above, as illustrated in row 410 of FIG. 4.

Subsequently, an OS reconfiguring unit included in the OS reconfiguration apparatus may verify the determined type of the application, may set an assigned OS partition to be used for at least one of pipelining, scatter-gather, and SMP, and may reconfigure an OS, as illustrated in row 420 of FIG. 4.

Referring again to FIG. 4, a variety of functions may be activated or deactivated according to the OS partition assigned by the OS reconfiguration apparatus. The variety of functions, as illustrated in rows 430 of FIG. 4, include tick handling, multitasking, load balancing, and IPC and synchronization although other functions that are not listed may equally be activated or deactivated. In FIG. 4, an "X" denotes a deactivated function while an "O" denotes an activated function.

In an example, when the assigned OS partition is set to be used for pipelining, the OS reconfiguring unit may activate only a data distribution function between tasks and a load balancing function between tasks in the OS, and may reconfigure the OS.

In another example, when the assigned OS partition is set to be used for scatter-gather, the OS reconfiguring unit may activate only a communication function between tasks and a synchronization function between tasks in the OS, and may reconfigure the OS.

In still another example, when the assigned OS partition is set to be used for SMP, the OS reconfiguring unit may activate all functions of the OS, and may reconfigure the OS.

Specifically, when an application has a stream processing type 510 of FIG. 5, the OS reconfiguring unit may set the assigned OS partition to be used for pipelining, as illustrated at column 440 of FIG. 4.

In this instance, referring to FIG. 4, the OS reconfiguring unit may execute a single task per core, and may deactivate functions other than a communication function between tasks and a synchronization function between tasks, as illustrated at column 440 of FIG. 4, where a tick handling function, a multitasking function, and a load balancing function are each indicated as deactivated and an IPC and synchronization function is indicated as activated.

When a predetermined function is deactivated, a run-time overhead of the predetermined function may be reduced, and accordingly a performance of an application may be improved.

For example, when an application has a data-parallel processing type 520 of FIG. 5, the OS reconfiguring unit may set the assigned OS partition to be used for scatter-gather.

When the assigned OS partition is set to be used for scatter-gather, the OS reconfiguring unit may activate a communication function between tasks and a synchronization function between tasks in the OS, and may reconfigure the OS. Further, when the assigned OS partition is set to be used for scatter-gather, a single worker task may be executed per core, and data may be dynamically distributed between tasks, and accordingly a load balancing function may be additionally required.

The other functions may be deactivated. This is illustrated at column 450 of FIG. 4, where a tick handling function and a multitasking function are each indicated as deactivated and a load balancing function and an IPC and synchronization function are each indicated as activated.

Additionally, when an application has a multithreading type 530 of FIG. 5, the OS reconfiguring unit may set the assigned OS partition to be used for SMP. When the assigned OS partition is set to be used for SMP, the OS reconfiguring unit may activate all functions of the OS, as illustrated at column 460 of FIG. 4, where a tick handling function, a multitasking function, a load balancing function, and an IPC and synchronization function are each indicated as activated.

Accordingly, when functions of an OS are determined as unnecessary or not required based on a type of an application, a performance of a system may be improved by removing corresponding overheads. Such functions may include overhead functions. More specifically, such functions may include one or more of a tick handling function, a multitasking function, a load balancing function, and an IPC and synchronization function. In an embodiment, a function is determined as unnecessary or not required when the function is not needed for proper execution of a particular application or when the function is not used in the particular application.

Figure 6:
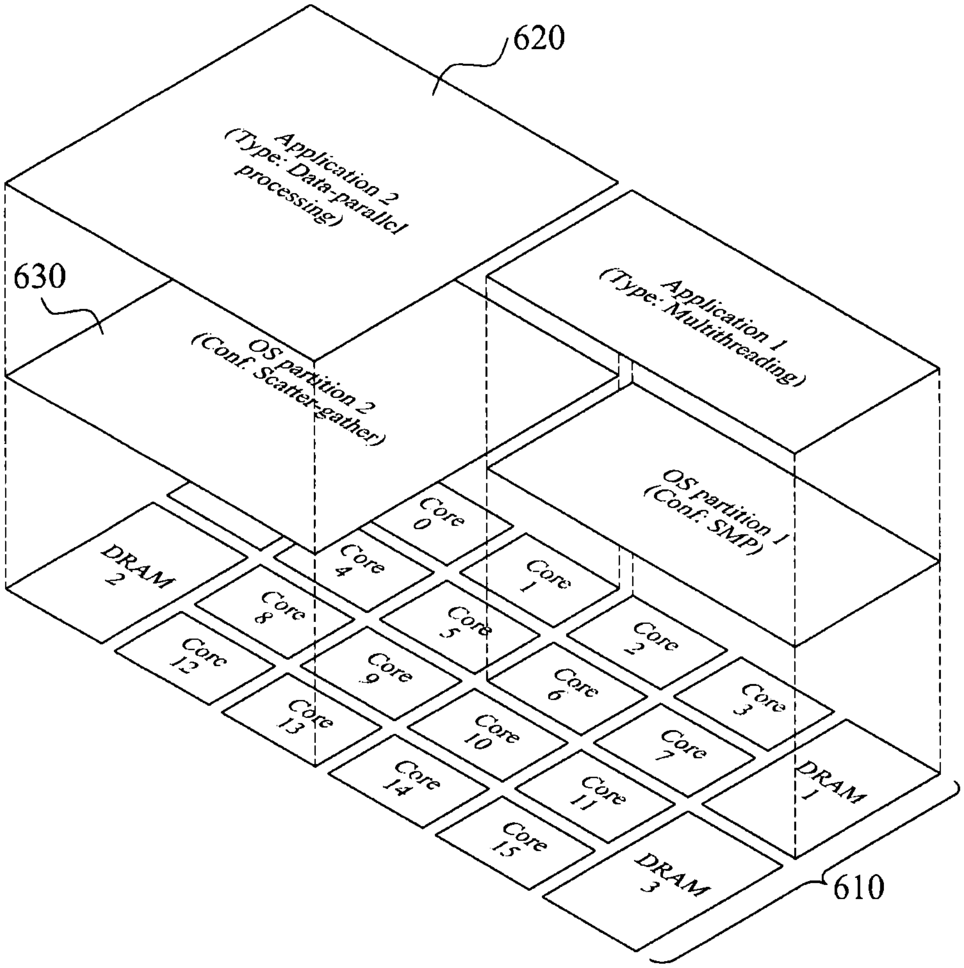
FIG. 6 illustrates a diagram of an example in which an existing application is terminated and a new application is started, using an apparatus for dynamically reconfiguring an OS for a manycore system according to example embodiments.

FIG. 6 illustrates a diagram of an example in which an existing application is terminated and a new application is started, using an OS reconfiguration apparatus according to example embodiments.

Referring to FIG. 6, when application 0 is terminated and when application 2 620 is started in system 610, resources of OS partition 0, for example core 0, core 1, core 4, core 5, and DRAM 0, may be returned, and resources of OS partition 2 630 may be allocated. The resources of the OS partition 2 630 may include, for example, core 0, core 1, core 4, core 5, core 8, core 9, core 12, core 13, DRAM 0, and DRAM 2.

As described above, resources may be efficiently used as occasion demands, rather than being fixed to a predetermined application and an OS.

A corresponding OS partition may be set to be used for scatter-gather, based on a type of an application, for example a data-parallel processing type.

Figure 7:
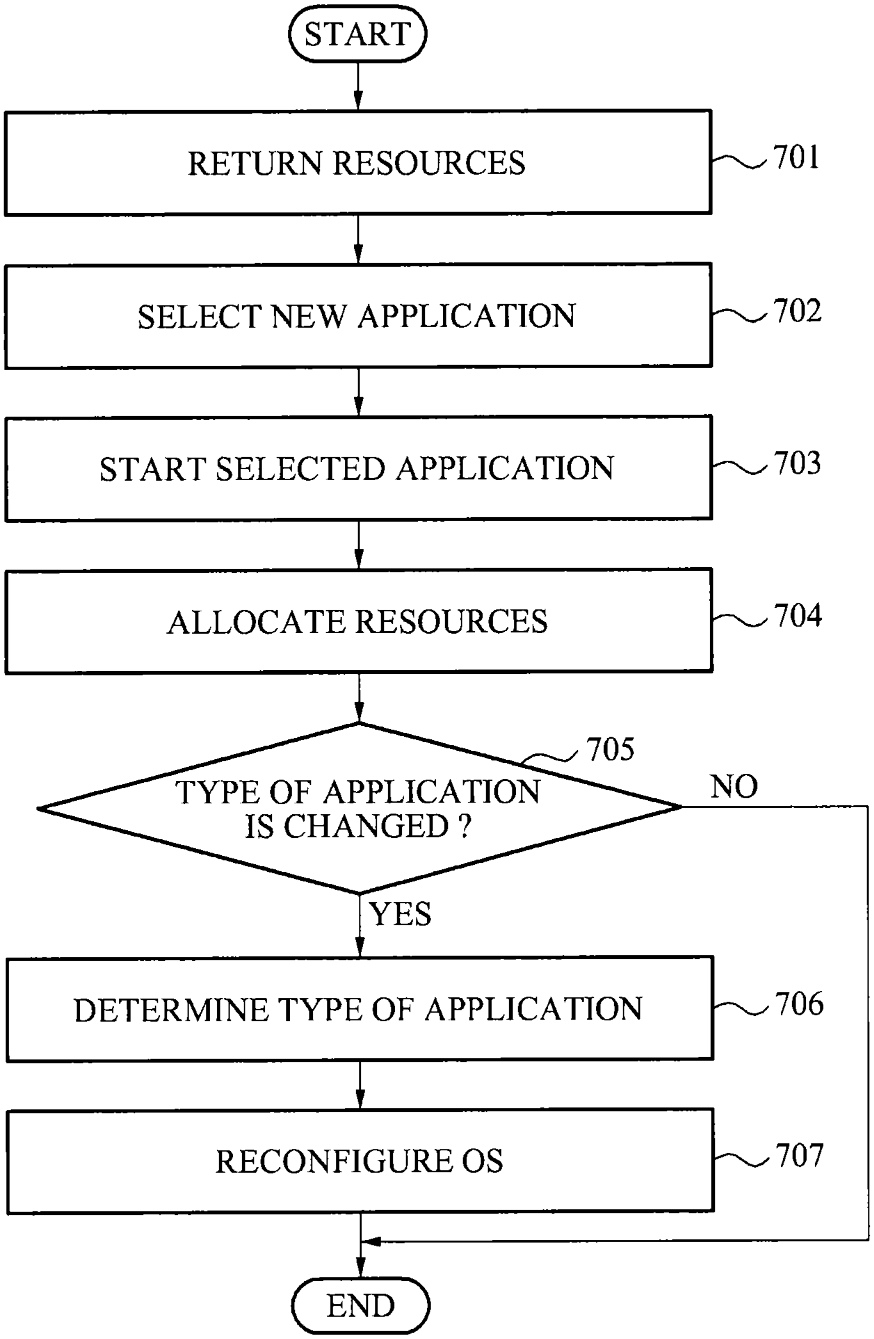
FIG. 7 illustrates a flowchart of a method of dynamically reconfiguring an OS for a manycore system according to example embodiments.

FIG. 7 illustrates a flowchart of a method of dynamically reconfiguring an OS for a manycore system according to example embodiments.

Referring to FIG. 7, when a previous application is terminated, resources may be returned to an OS in operation 701.

In operation 702, a new application may be selected. In operation 703, the selected application may be started.

In operation 704, resources may be allocated to the started application, namely a currently executed application, through the OS. The resources may include, for example cores, DRAMs, and the like.

In operation 705, whether a type of the currently executed application is changed may be determined based on a type of the previous application.

When the type of the currently executed application is determined to be changed in operation 705, the type of the currently executed application may be determined in operation 706, and the OS may be reconfigured based on the determined type in operation 707.

Conversely, when the type of the currently executed application is determined to remain unchanged in operation 705, the currently executed application may be processed, instead of the OS being reconfigured.

Figure 8A:
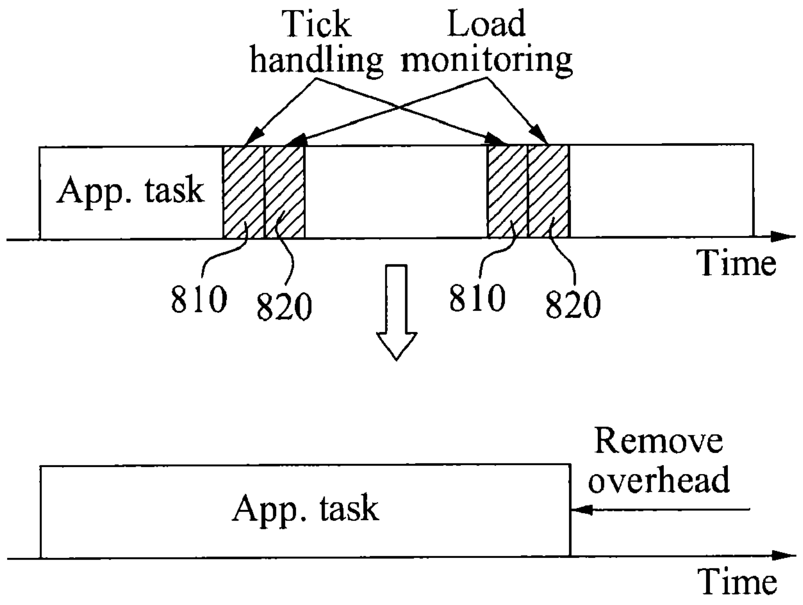
FIGS. 8A and 8B illustrate diagrams to explain effects obtained by using an apparatus and method for dynamically reconfiguring an OS for a manycore system according to example embodiments.
Figure 8B:
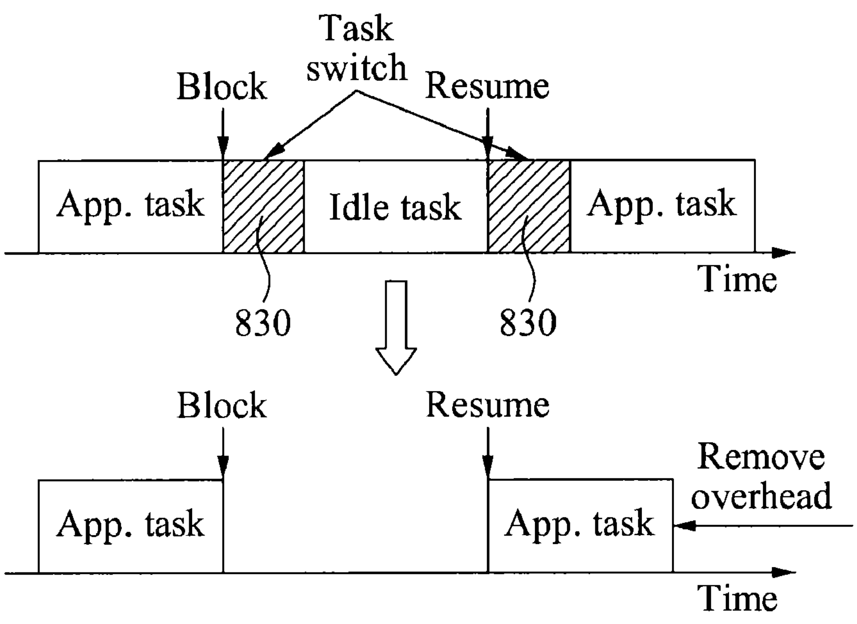

FIGS. 8A and 8B illustrate diagrams to explain effects obtained by using an apparatus and method for dynamically reconfiguring an OS for a manycore system according to example embodiments.

Effects expected when the apparatus and method for dynamically reconfiguring an OS for a manycore system are used will be described with reference to FIGS. 8A and 8B.

To provide various system services, an OS may cause a periodic overhead, for example tick handling 810, load monitoring 820, and the like, as shown in FIG. 8A.

For example, when the above-described functions of the OS are not required based on a type of an application, a performance of a system may be improved by removing corresponding overheads.

Additionally, when a currently executed task of an application is blocked due to a problem, such as a wait for data or synchronization, and the like, task switch 830 may occur, as shown in FIG. 8B. Subsequently, when the blocked task is resumed, the task switch 830 may also occur. When a number of tasks executable based on a type of the application is limited to one, a corresponding overhead may be removed and a faster response time of the task may be achieved by preventing the task switch 830.

The method for dynamically reconfiguring an OS for a manycore system according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for dynamically reconfiguring an OS for a manycore system described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for dynamically reconfiguring an Operating System (OS) for a manycore system, the apparatus comprising:

an application type determining unit to determine a type of an executed application; and an OS reconfiguring unit to deactivate at least one function performed by an OS partition based on the determined type of the application, wherein at least one core of a plurality of processing cores is dynamically assigned to the OS partition, wherein the OS reconfiguring unit assigns an OS partition assignable in the manycore system, based on the determined type of the application, wherein, when an assigned OS partition is set to be used for pipelining, the OS reconfiguring unit activates a data distribution function between tasks and a load balancing function between tasks in the OS while deactivating the at least one function in the OS.

2. The apparatus of claim 1, wherein the application type determining unit verifies the executed application, and determines the type of the verified application to be at least one of a stream processing type, a data-parallel processing type, and a multithreading type.

3. The apparatus of claim 1, wherein the OS reconfiguring unit sets the assigned OS partition to be used for at least one of pipelining, scatter-gather, and Symmetric Multi-Processing (SMP).

4. The apparatus of claim 3, wherein the at least one function is deactivated when the at least one function is determined to be unnecessary for proper execution of the type of the executed application.

5. An apparatus for dynamically reconfiguring an Operating System (OS) for a manycore system, the apparatus comprising:

an application type determining unit to determine a type of an executed application; and an OS reconfiguring unit to deactivate at least one function performed by an OS partition based on the determined type of the application, wherein at least one core of a plurality of processing cores is dynamically assigned to the OS partition, wherein the OS reconfiguring unit assigns an OS partition assignable in the manycore system, based on the determined type of the application, wherein the OS reconfiguring unit sets the assigned OS partition to be used for at least one of pipelining, scatter-gather, and Symmetric Multi-Processing (SMP), and reconfigures the OS, wherein, when the assigned OS partition is set to be used for scatter-gather, the OS reconfiguring unit activates a communication function between tasks and a synchronization function between tasks in the OS while deactivating the at least one function in the OS.

6. A method of dynamically reconfiguring an Operating System (OS) for a manycore system, the method comprising:

determining a type of an executed application; and deactivating at least one function in an OS partition based on the determined type of the application, wherein at least one core of a plurality of processing cores is dynamically assigned to the OS partition, wherein the deactivating comprises:

assigning an OS partition assignable in the manycore system, based on the determined type of the application; and reconfiguring the assigned OS partition, wherein, when an assigned OS partition is set to be used for pipelining, the method further comprises:

activating a data distribution function between tasks and a load balancing function between tasks in the OS while deactivating the at least one function in the OS.

7. The method of claim 6, wherein the determining comprises verifying the executed application, and determining the type of the verified application to be at least one of a stream processing type, a data-parallel processing type, and a multithreading type.

8. A non-transitory computer readable recording medium storing a program to cause a computer to implement the method of claim 6.

9. A method for dynamically reconfiguring an Operating System (OS) for a manycore system, the method comprising:

determining a type of application to be executed in the manycore system;

determining whether a function associated with the type of application to be executed is necessary or unnecessary; and deactivating the function associated with the type of application determined to be executed when the function is determined to be unnecessary wherein the function is performed by an OS partition of the OS, wherein the deactivating comprises:

assigning an OS partition assignable in the manycore system, based on the determined type of the application; and reconfiguring the assigned OS partition, wherein, when an assigned OS partition is set to be used for pipelining, the method further comprises:

activating a data distribution function between tasks and a load balancing function between tasks in the OS while deactivating the at least one function in the OS.

10. The method of claim 9, wherein the function comprises an overhead function.

11. The method of claim 9, wherein the function comprises one or more of a tick handling function, a multitasking function, a load balancing function, and an IPC and synchronization function.

12. The method of claim 9, wherein the function is determined as unnecessary when the function is not required for proper execution of the type of application that is to be executed.

13. A non-transitory computer readable recording medium storing a program to cause a computer to implement the method of claim 9.

* * * * *